United States Patent
Mentzer

(10) Patent No.: US 7,081,922 B2
(45) Date of Patent: Jul. 25, 2006

(54) APPARATUS AND METHOD FOR OBTAINING AVERAGE SCENE INTENSITY INFORMATION FROM A PHOTO DETECTOR ARRAY

(76) Inventor: Ray Mentzer, 3444 SW. Hil-Wood Pl., Corvallis, CA (US) 97333

( * ) Notice: Subject to any disclaimer, the term of this patent is extended or adjusted under 35 U.S.C. 154(b) by 817 days.

(21) Appl. No.: 10/008,968

(22) Filed: Dec. 6, 2001

(65) Prior Publication Data

US 2003/0107665 A1    Jun. 12, 2003

(51) Int. Cl.
*H04N 5/235*    (2006.01)
(52) U.S. Cl. ................. 348/230.1; 348/229.1; 348/308
(58) Field of Classification Search ........... 348/362, 348/366, 222.1, 294–296, 304–306, 308, 348/302–303, 307, 229.1, 230.1, 300–301; 250/208.1
See application file for complete search history.

(56) References Cited

U.S. PATENT DOCUMENTS

| 5,262,871 | A   | * | 11/1993 | Wilder et al. ............... 348/307 |
| 5,949,483 | A   | * | 9/1999  | Fossum et al. ............. 348/303 |
| 6,252,217 | B1  | * | 6/2001  | Pyyhtia et al. ........... 250/208.1 |
| 6,693,670 | B1  | * | 2/2004  | Stark ......................... 348/308 |
| 6,794,627 | B1  | * | 9/2004  | Lyon et al. .............. 250/208.1 |
| 6,801,258 | B1  | * | 10/2004 | Pain et al. .................. 348/302 |
| 2002/0186312 | A1 | * | 12/2002 | Stark ......................... 348/302 |

* cited by examiner

*Primary Examiner*—Tuan Ho
*Assistant Examiner*—Brian Jelinek

(57) ABSTRACT

An optical sensor array includes an array of pixel circuits. Each pixel circuit includes a photo detector and a voltage supply line. The voltage supply line from each pixel circuit is connected to a common node. A voltage supply input configured to be coupled to a voltage supply and to the common node supplies a voltage to each pixel circuit. A sensing circuit coupled to the common node senses signals from the common node and outputs at least one signal representative of an average intensity of light directed onto the array of pixel circuits.

21 Claims, 5 Drawing Sheets

APPARATUS AND METHOD FOR OBTAINING AVERAGE SCENE INTENSITY INFORMATION FROM A PHOTO DETECTOR ARRAY

THE FIELD OF THE INVENTION

This invention relates generally to optical sensor devices. This invention relates more particularly to an optical sensor device configured to quickly provide average scene intensity information.

BACKGROUND OF THE INVENTION

In existing digital cameras, there is a delay between the time when a user presses the button to take a picture and the time that a final image is actually taken. Between these times, the digital camera determines an average scene intensity, and determines appropriate exposure and gain settings based on the average scene intensity. In some digital cameras, at least nine frames are captured to determine the appropriate exposure and gain settings. If an object that a user is interested in imaging is moving, the object may be out of place or gone by the time the camera is ready to take the final image.

In previous digital cameras, all of the pixels in the pixel array were individually processed to determine the average scene intensity. In some digital cameras, it takes 9 clock cycles to process one pixel. For a VGA size array (i.e., 480×640 pixels), it would take several million clock cycles to process a frame. Some optical sensors allow sub-sampling, where only a portion of the pixels in the array are sampled, such as every other pixel, or every other set of two pixels. Even with sub-sampling, it could take several hundred thousand clock cycles to process a frame.

It would be desirable to provide a faster technique for obtaining average scene intensity information, and thereby minimize the amount of time between when a user pushes the button on a digital camera to take a picture, and the time that a final image is captured.

SUMMARY OF THE INVENTION

One form of the present invention provides an optical sensor array including an array of pixel circuits. Each pixel circuit includes a photo detector and a voltage supply line. The voltage supply line from each pixel circuit is connected to a common node. A voltage supply input configured to be coupled to a voltage supply and to the common node supplies a voltage to each pixel circuit. A sensing circuit coupled to the common node senses signals from the common node and outputs at least one signal representative of an average intensity of light directed onto the array of pixel circuits.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
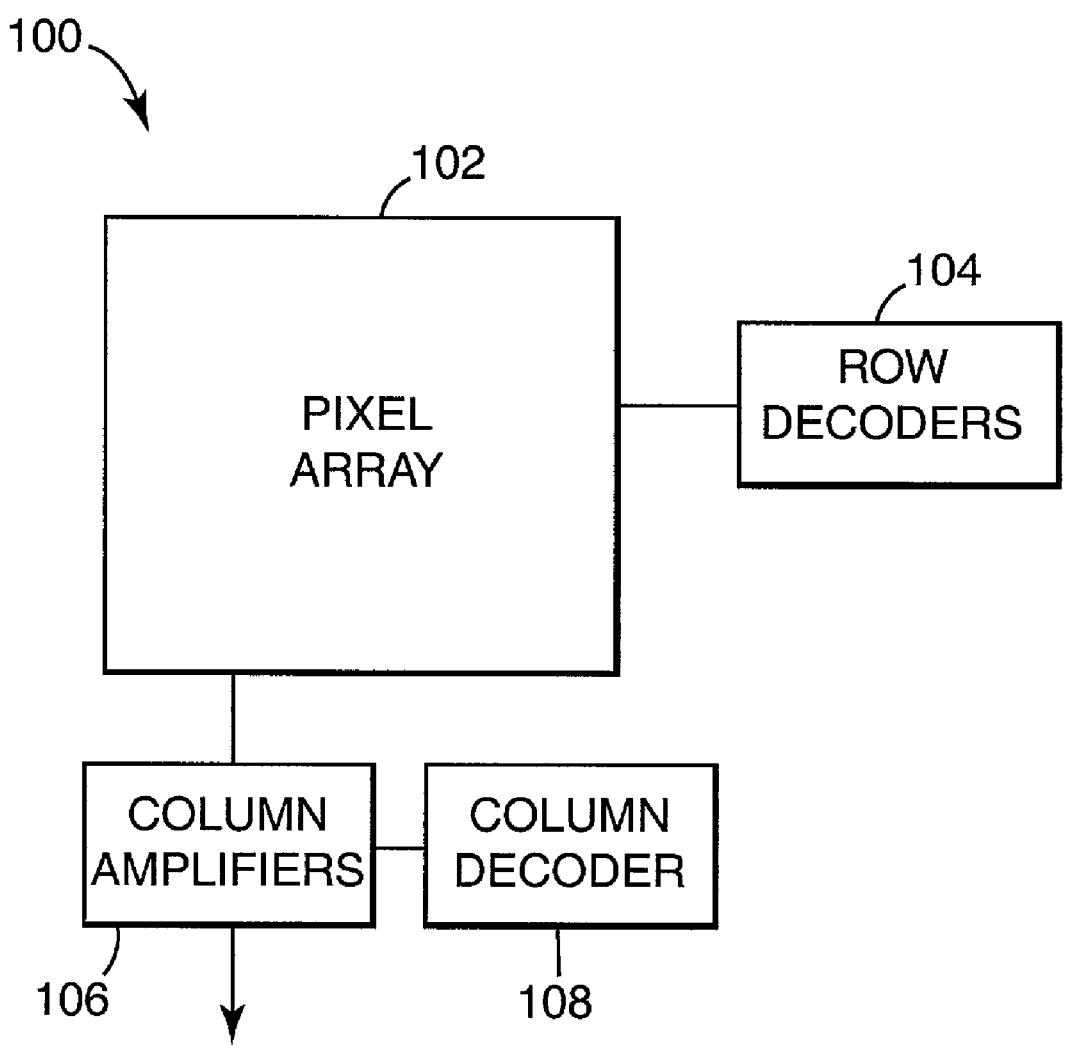
FIG. 1 is an electrical block diagram illustrating major components of a prior art sensor array.

FIG. 1 is an electrical block diagram illustrating major components of a prior art sensor array 100. Sensor array 100 includes pixel array 102, row decoders 104, column amplifiers 106, and column decoder 108. Pixel array 102 includes a plurality of pixel circuits 200 (shown in FIG. 2A), with each pixel circuit 200 providing one pixel of image information. The pixels in pixel array 102 are organized into a plurality of rows and a plurality of columns (e.g., 480×640). Existing sensor arrays, such as sensor array 100, also typically include gain amplifiers, analog-to-digital converters, and digital control logic (not shown), to amplify, digitize, and process the signals from column amplifiers 106. Sensor array 100 is discussed in further detail below with reference to FIGS. 2A and 2B.

Figure 2A:
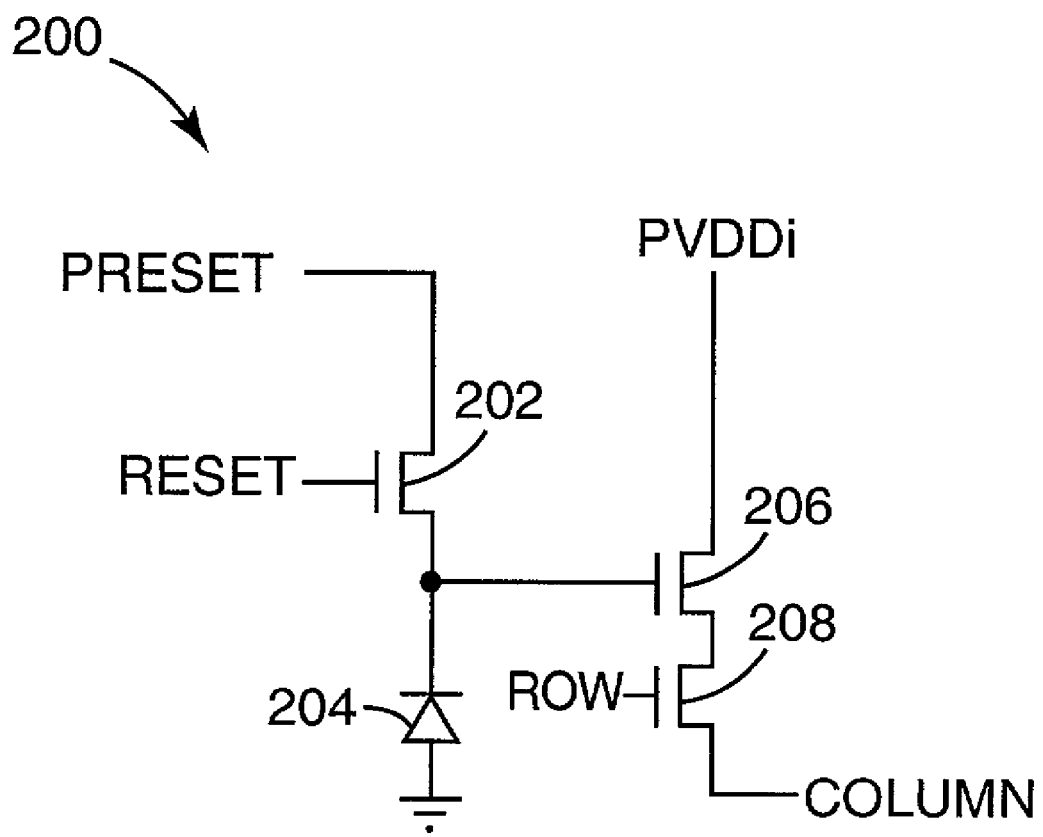
FIG. 2A is an electrical schematic diagram illustrating one embodiment of a pixel circuit.

FIG. 2A is an electrical schematic diagram illustrating one embodiment of a pixel circuit 200. In one form of the invention, pixel array 102 includes hundreds of thousands of pixel circuits 200 organized into rows and columns. Pixel circuit 200 includes transistors 202, 206, and 208, and photo diode 204. In one embodiment, transistors 202, 206, and 208 are NMOS field effect transistors (FETs). The drain of transistor 202 is coupled to a PRESET line. The gate of transistor 202 is coupled to a RESET line. The source of transistor 202 is coupled to photo diode 204 and to the gate of transistor 206. In addition to being connected to the source of transistor 202, photo diode 204 is also coupled to ground. The drain of transistor 206 is coupled to a PVDDi node. The source of transistor 206 is coupled to the drain of transistor 208. The gate of transistor 208 is coupled to a ROW line. The source of transistor 208 is coupled to a COLUMN line.

Pixel information from pixel array 102 is sampled in rows. The sampling time for each row of pixels is referred to as a row sample interval. A row of pixels (i.e., a row of pixel circuits 200) in pixel array 102 is selected by row decoders 104. To select a row of pixels, row decoders 104 asserts the ROW line high for each pixel circuit 200 in the desired row.

Figure 2B:
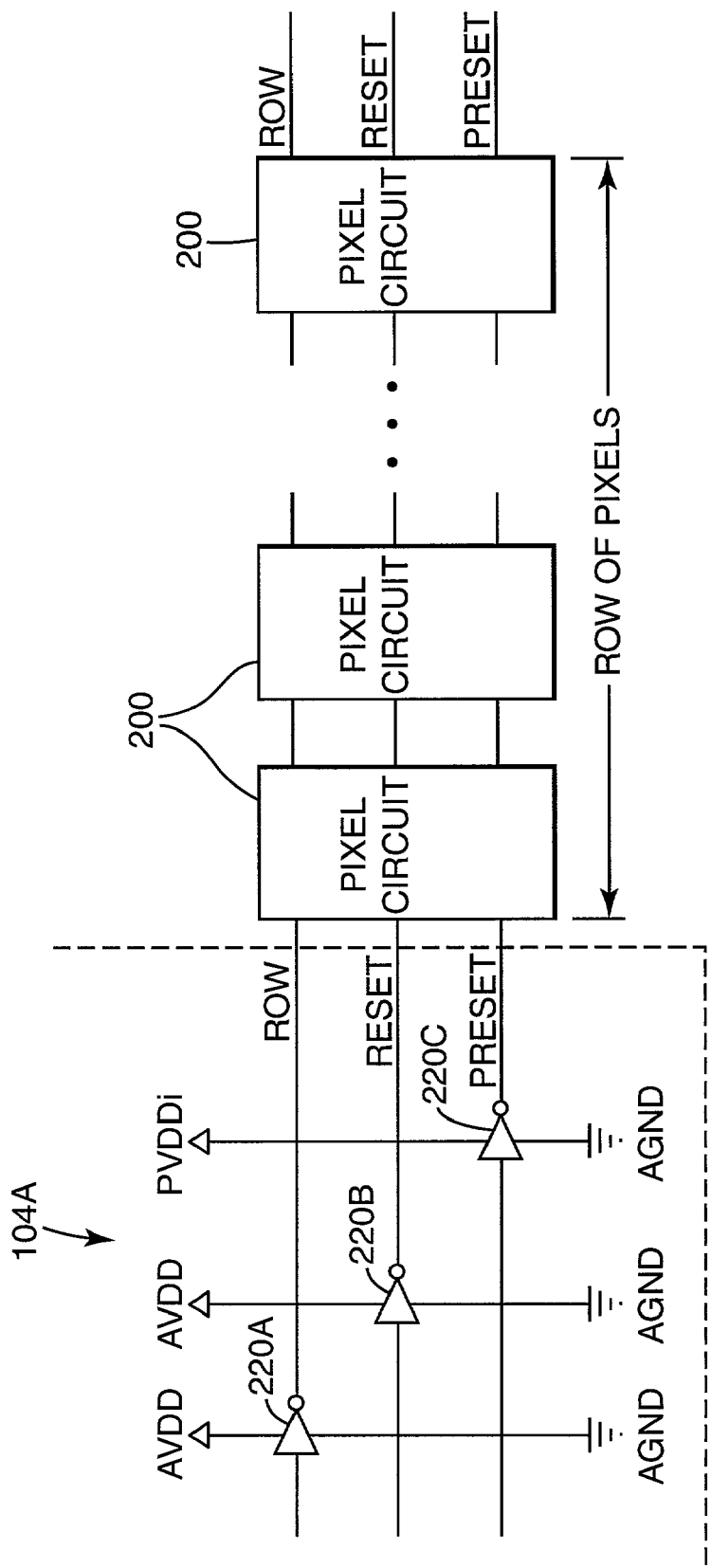
FIG. 2B is a diagram of a row of pixel circuits coupled to an output stage of a row decoder.

FIG. 2B is a diagram of a row of pixel circuits 200 coupled to an output stage 104A of row decoders 104. Output stage 104A includes inverters 220A–220C, which drive the ROW, RESET, and PRESET lines, respectively, of pixel circuits 200. The VDD connection of inverters 220A and 220B are connected to an analog power supply AVDD. The VDD connection of inverter 220C is connected to PVDDi. Inverters 220A–220C are also coupled to analog ground (AGND).

The sampling of pixel information is divided into three phases: (1) an integration reset phase; (2) an integration phase; and (3) a sample reset phase. The integration reset phase begins by asserting ROW and RESET high and PRESET low for desired pixel circuits 200, thereby exposure-presetting photodiodes 204. During the integration reset phase, photodiodes 204 are charged to a reset voltage, which is equal to PVDD minus $V_{TN}$. PVDD is a pixel voltage supply that is coupled to node PVDDi during normal modes of operation, as described below. In one embodiment, PVDD is a nominal 3.3 volts. In an alternative embodiment, PVDD is a nominal 2.8 volts. In one form of the invention, PVDD is supplied by an external voltage supply. $V_{TN}$ is an NMOS transistor threshold voltage, which is approximately 1.1 volts in one embodiment. The integration reset phase ensures that each pixel circuit 200 starts from a common voltage independent of the integration level of a previously captured frame.

In one embodiment, during the integration reset phase, PRESET is asserted low for four clock cycles, and then approximately four microseconds later, RESET and ROW are asserted low, thereby starting the integration phase. In one form of the invention, a clock rate of 24 MHz is used, although other clock rates may be used. While ROW and RESET are low and PRESET is high, pixel circuit 200 integrates the amount of light focused onto photodiode 204 by a lens system (not shown), and photo diode 204 discharges from the reset level downward. At the end of the integration period, ROW pulses high, thereby passing the integration voltage on photodiode 204 onto the COLUMN line.

The COLUMN line for each pixel circuit 200 is connected to column amplifiers 106. Column amplifiers 106 act as an analog buffer that samples and holds the outputs of a selected row of pixels. At the end of the integration period, column amplifiers 106 sample the integrated signal levels (on the COLUMN lines) from a selected row of pixels.

The third phase of pixel sampling is the sample reset phase, where a selected row of pixels is reset. After a column settling time, which, in one form of the invention, is approximately 1.9 microseconds after ROW pulses high at the end of the integration period, RESET is asserted high for 4 microseconds plus 5 clock cycles, and PRESET is asserted low for 4 clock cycles. At the end of the sample reset phase, column amplifiers 106 sample the reset level on the COLUMN line of the selected pixel circuits 200.

The image signal generated by each pixel circuit 200 is the difference between the sampled reset voltage level and the voltage on the photodiode 204 after the integration period (i.e., the sampled integration signal level). At the end of a row sample interval, the difference between the reset and integrated signal levels is held on the outputs of column amplifiers 106, referenced to a common mode reference level. During a column processing interval, column amplifiers 106 are sequentially selected by column decoder 108 to output the corresponding held level.

Figure 3:
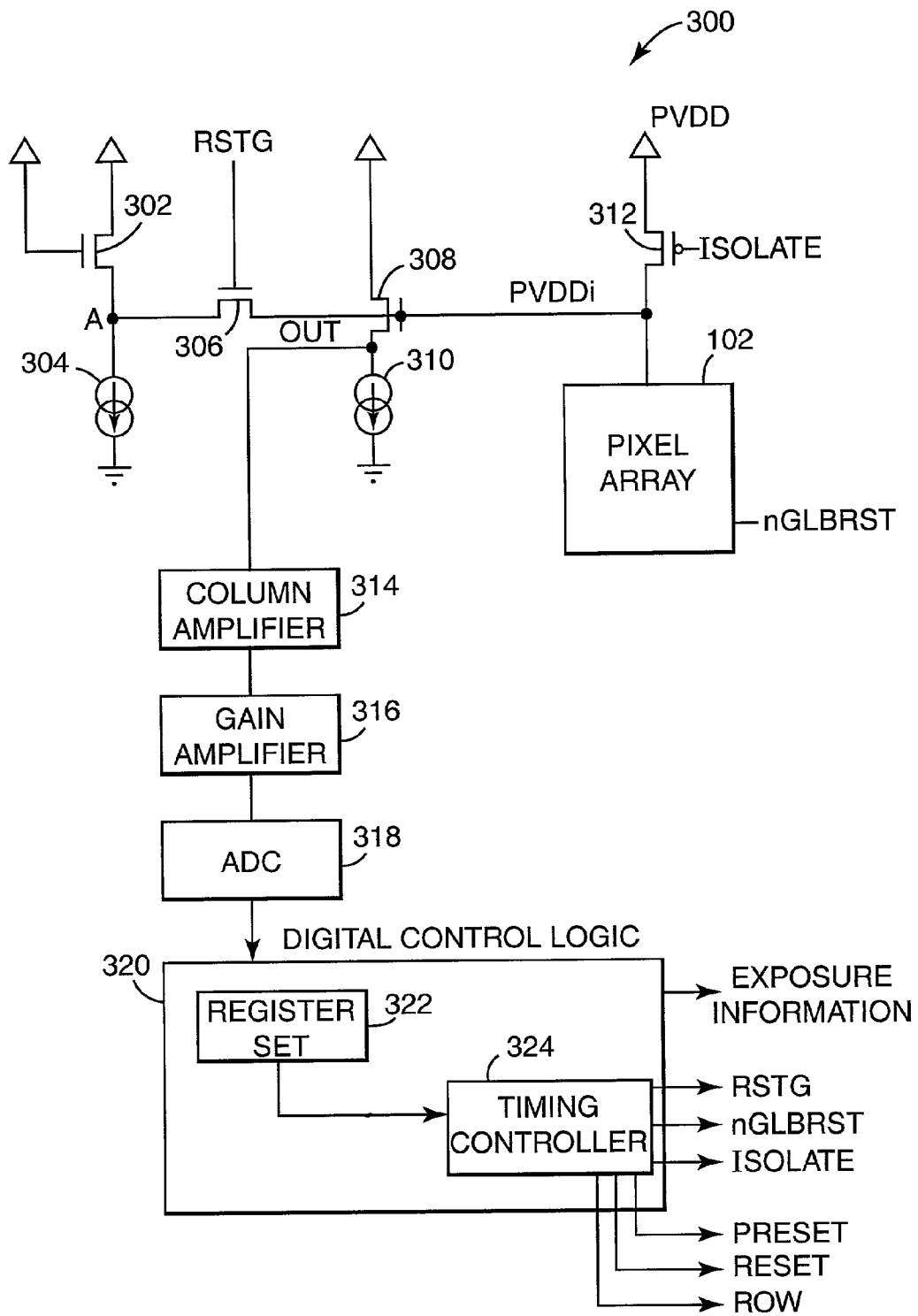
FIG. 3 is a diagram of a sensor array according to one embodiment of the present invention.

FIG. 3 is a diagram of a sensor array 300 according to one embodiment of the present invention. Sensor array 300 includes transistors 302, 306, 308, and 312, current sources 304 and 310, pixel array 102, column amplifier 314, gain amplifier 316, analog-to-digital converter (ADC) 318, and digital control logic 320. Digital control logic 320 includes register set 322 and timing controller 324. In one embodiment, transistors 302, 306, and 308, are NMOS FETs, and transistor 312 is a PMOS FET.

The gate and the drain of transistor 302 are connected to pixel voltage supply PVDD. The source of transistor 302 is connected to current supply 304 and to the drain of transistor 306. Current supply 304 is also connected to ground. In one embodiment, current source 304 supplies a nominal current of about 100 microamps. The gate of transistor 306 is connected to an RSTG line. The source of transistor 306 is coupled to the gate of transistor 308, which is also coupled to the PVDDi node. The drain of transistor 308 is coupled to pixel voltage supply PVDD. The source of transistor 308 is coupled to current source 310, and to an output (OUT) node. Current source 310 is also connected to ground. In one embodiment, current source 310 supplies a nominal current of about 10 microamps.

The source of transistor 312 is connected to pixel voltage supply PVDD. The gate of transistor 312 is connected to an ISOLATE line. The drain of transistor 312 is connected to the PVDDi node, which is connected to the PVDDi line of each of the pixel circuits 200 in pixel array 102. In one embodiment, transistor 312 is relatively large (e.g., several hundred microns), but is constructed in a manner to minimize the impact on chip size.

Various modes of operation of sensor array 300 can be programmed by setting various bits in register set 322. During normal modes of operation, the ISOLATE signal is low, causing transistor 312 to be on, thereby shorting PVDD to node PVDDi. During normal modes of operation, timing controller 324 generates appropriately timed signals (e.g., PRESET, RESET, and ROW) for capturing image frames in a normal manner as described above. Register set 322 also provides a global photo diode mode for quickly obtaining average scene intensity information. During the global photo diode mode, timing controller 324 sets the ROW lines low and the PRESET line high. During the global photo diode mode, timing controller 324 also generates RSTG, nGLBRST, and ISOLATE signals. The global photo diode mode is discussed in further detail below with reference to FIG. 4.

Figure 4:
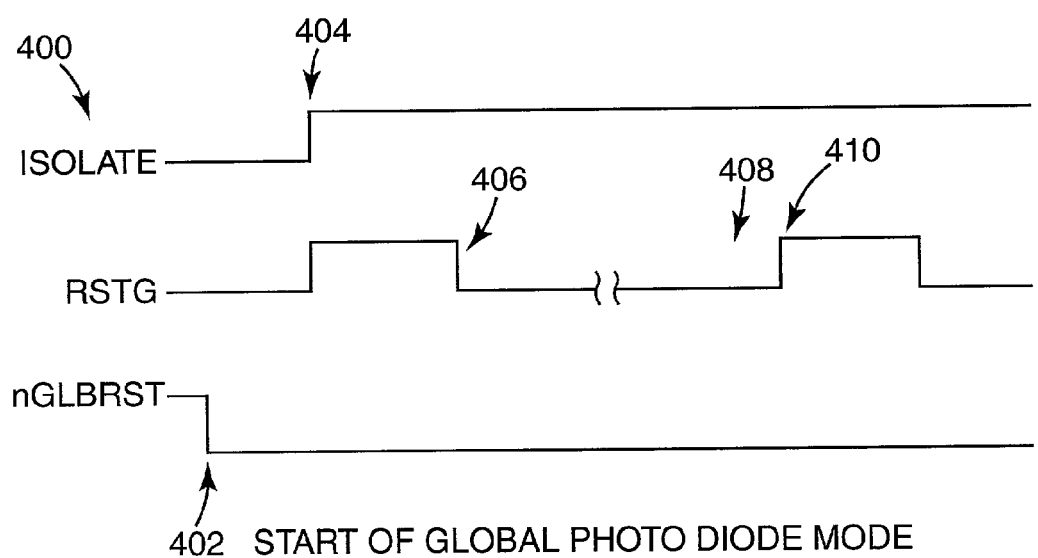
FIG. 4 is a timing diagram illustrating the timing of various control signals used by the sensor array shown in FIG. 3.

FIG. 4 is a timing diagram illustrating the timing of various control signals 400 used by sensor array 300 during the global photo diode mode. At the start of the global photodiode mode, nGLBRST is set low (indicated by reference number 402) by timing controller 324. The nGLBRST signal is coupled through an inverter (not shown) to the RESET line of each pixel circuit 200 in array 102. Setting nGLBRST low causes the RESET line at the gate of transistor 202 in each pixel circuit 200 to go high. When the RESET line of each pixel circuit 200 is set high, all of the photodiodes 204 in array 102 charge to a nominal voltage of PVDD minus $V_{TN}$.

At some time after nGLBRST is set low (indicated by reference number 404), the ISOLATE and RSTG signals are set high by timing controller 324. In one embodiment, the ISOLATE and RSTG signals are set high approximately four microseconds after nGLBRST is set low. Setting ISOLATE high turns transistor 312 off, thereby isolating the PVDDi lines of the pixel circuits 200 in pixel array 102 from the pixel voltage supply PVDD. When the ISOLATE and RSTG signals are set high, the PVDDi node discharges to the voltage PVDD minus $V_{TN}$ through transistor 306 and current source 304. Transistor 302 is biased such that the voltage at node A is approximately equal to the reset voltage set on each of the pixel circuits 200.

When RSTG is set low by timing controller 324 (indicated by reference number 406), the voltage at the PVDDi node decays proportionally to the average photo current across all of the pixel circuits 200. The PVDDi node acts as a summing node for all of the pixel circuits 200 in array 102, and all of photo currents from the pixel circuits 200 discharge through the PVDDi node. The sensitivity of array 102 in the global photo diode mode is much lower than that of any individual pixel in array 102. At the end of an integration time (indicated by reference number 408), the integrated voltage at node OUT is sampled and held by column amplifier 314. In one embodiment, the integration time is programmable via register set 322.

After the integrated voltage at node OUT has been sampled by column amplifier 314, timing controller 324 sets RSTG high (indicated by reference number 410) to generate a reset. After a settling time, column amplifier 314 samples the reset voltage at node OUT, and outputs a signal (equal to the difference between the integrated voltage at node OUT and the reset voltage at node OUT) to gain amplifier 316. Gain amplifier 316 amplifies the signal from column amplifier 314, and outputs the amplified signal to analog-to-digital converter 318. The amplified signal is digitized by analog to digital converter 318, and one or more digital samples are provided to digital control logic 320.

In one form of the invention, in the global photo diode mode, the difference between the integrated voltage and the reference voltage at node OUT is amplified and digitized through the same path as used by any one of the pixel circuits 200 in array 102 during normal modes of operation. Thus, in addition to being used for amplifying and digitizing signals from the COLUMN line of one or more pixel circuits 200 during normal modes of operation, column amplifier 314, gain amplifier 316, and analog-to-digital converter 318 are also used for amplifying and digitizing signals from the OUT node during the global photo diode mode. In an alternative embodiment, an additional column amplifier 314, gain amplifier 316, and/or analog-to-digital converter 318 may be added to implement the functionality described herein for the global photo diode mode.

The digital samples output by analog-to-digital converter 318 to digital control logic 320 are representative of the average scene intensity of the scene focused onto pixel array 102. In one embodiment, average scene intensity information is obtained in nine clock cycles in the global photo diode mode. Digital control logic 320 determines and outputs appropriate exposure timing information based on the digital samples received from analog-to-digital converter 318. In one embodiment, the average scene intensity information obtained by placing all of the photo diodes 204 in parallel in the global photo diode mode is used as starting point for determining an appropriate exposure setting, and then one or two frames are processed in a standard manner in a normal mode of operation to determine a more exact average scene intensity.

It will be understood by a person of ordinary skill in the art that functions performed by sensor array 300 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One embodiment of the present invention provides a means for quickly obtaining information regarding the average power in a scene to be imaged, thereby allowing exposure and gain settings to be determined more quickly than prior art techniques. In one form of the invention, the scene information is obtained quickly by combining all of the photo diodes in parallel via a pixel voltage supply connection to the pixel array. In one embodiment, the pixel voltage supply node is used as a common to short all of the photo diodes in the pixel array together, and then in nine clock cycles, average scene intensity information can be obtained. Placing all of the photo diodes in parallel produces an averaging effect for the scene being imaged.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An optical sensor may comprising:
    an array of pixel circuits, each pixel circuit including a photo detector, a voltage supply line, and an output node for outputting image signals from the pixel circuit, wherein the voltage supply lines of the pixel circuits are connected directly to a common node of the sensor array that is separate from the output nodes of the pixel circuits;
    a voltage supply input configured to be coupled to a voltage supply and to the common node for supplying a voltage to each pixel circuit; and
    a sensing circuit coupled to the common node for sensing signals at the common node and outputting at least one signal representative of an avenge intensity of light directed onto the array of pixel circuits.

2. The optical sensor array of claim 1, and further comprising:
    a switching device coupled between the voltage supply input and the common node for selectively connecting and disconnecting the voltage supply input and the common node.

3. The optical sensor array of claim 2, wherein the switching device is a transistor.

4. The optical sensor array of claim 2, wherein the sensing circuit comprises:
    a first, a second, and a third FET transistor, the second transistor coupled between the first and the third transistors;
    a first and a second current source, the first transistor coupled between the voltage supply input and the first current source, the third transistor coupled between the voltage supply input and the second current source; and
    an output node coupled between the third transistor and the second current source, the at least one signal output by the sensing circuit being output at the output node.

5. The optical sensor array of claim 4, wherein the first second, and third FET transistors are NMOS FET transistors.

6. The optical sensor array of claim 1, wherein the at least one signal output by the sensing circuit includes a reference signal and an integration signal, the optical sensor array further comprising:
    a column amplifier coupled to the sensing circuit for receiving the reference signal and the integration signal, the column amplifier configured to output a difference signal representing a difference between the reference signal and the integration signal.

7. The optical sensor array of claim 6, and further comprising:

a gain amplifier coupled to the column amplifier for receiving the difference signal from the column amplifier and outputting an amplified difference signal.

8. The optical sensor array of claim 7, and further comprising:
an analog-to-digital converter coupled to the gain amplifier for receiving and digitizing the amplified difference signal, and outputting at least one digital value.

9. The optical sensor array of claim 8, and further comprising:
a digital controller coupled to the analog-to-digital converter for outputting camera exposure information based on the at least one digital value.

10. The optical sensor array of claim 1, and further comprising:
a digital controller configured to output control signals for controlling operation of the pixel circuits and the sensing circuit.

11. The optical sensor array of claim 10, wherein the digital controller comprises:
a register set for providing selectable modes of operation of the optical sensor array, the modes of operation including at least one normal mode of operation and a global mode of operation; and
a timing controller coupled to the register set for generating the control signals based on a selected mode of operation.

12. The optical sensor array of claim 11, wherein the control signals generated by the timing controller during the global mode of operation include signals for causing a global reset of the pixel circuits and for causing the pixel circuits to be isolated from the voltage input.

13. A method of obtaining average scene intensity information from a pixel array, the pixel array including a plurality of pixel circuits, each pixel circuit including a voltage supply line, the voltage supply lines of the pixel circuits coupled directly to a common power supply node of the pixel array, the common power supply node of the pixel array configured to be coupled to a voltage supply, each pixel circuit including an output node for outputting image signals from the pixel circuit, the method comprising:
isolating the pixel circuits from the voltage supply;
sensing signals at the common power supply node generated by the plurality of pixel circuits; and
generating at least one signal based on the sensed signals, the at least one signal representative of an average intensity of light directed onto the pixel array.

14. The method of claim 13, wherein the at least one signal includes a reference signal and an integration signal, the method further comprising:
generating a difference signal representing a difference between the reference signal and the integration signal.

15. The method of claim 14, and further comprising:
generating at least one digital value based on the difference signal.

16. The method of claim 15, and further comprising:
generating camera exposure information based on the at least one digital value.

17. A circuit for obtaining average scene intensity information from a pixel array having a plurality of pixel circuits, each pixel circuit coupled to a common power supply node that is configured to be coupled to a power supply, the circuit comprising:

an isolating device coupled between the common power supply node and the power supply, the isolating device configured to connect the power supply to the common power supply node during a normal mode of operation of the pixel array, the isolating device configured to isolate the common power supply node from the power supply during a global mode of operation of the pixel array; and
a sensing circuit coupled to the common power supply node for generating at least one signal indicative of an average intensity of light directed onto the pixel array during the global mode of operation.

18. The circuit of claim 17, wherein the at least one signal generated by the sensing circuit includes a reference voltage and an integration voltage, and wherein a difference between the reference voltage and the integration voltage is indicative of an average intensity of light directed onto the pixel array during the global mode of operation.

19. The circuit of claim 17, wherein the isolating device and the sensing circuit are configured to be controlled by control signals generated by digital control logic associated with the pixel may.

20. The circuit of claim 17, wherein the sensing circuit comprises:
a first, a second, and a third transistor;
a first and a second current source, the first and the second transistors coupled in parallel to the first current source, the second and third transistors coupled together, the third transistor coupled to the second current source; and
an output node coupled between the third transistor and the second current source, the at least one signal generated by the sensing circuit being output at the output node.

21. An optical sensor array comprising:
an array of pixel circuits, each pixel circuit including a photo detector and a voltage supply line, the voltage supply line of each pixel circuit connected to a common node;
a voltage supply input configured to be coupled to a voltage supply and to the common node for supplying a voltage to each pixel circuit;
a sensing circuit coupled to the common node for sensing signals at the common node and outputting at least one signal representative of an average intensity of light directed onto the array of pixel circuits; and
a digital controller configured to output control signals for controlling operation of the pixel circuits and the sensing circuit, wherein the digital controller comprises:
a register set for providing selectable modes of operation of the optical sensor array, the modes of operation including at least one normal mode of operation and a global mode of operation; and
a timing controller coupled to the register set for generating the control signals based on a selected mode of operation, wherein the control signals generated by the timing controller during the global mode of operation include signals for causing a global reset of the pixel circuits and for causing the pixel circuits to be isolated from the voltage input.

* * * * *